United States Patent
Bakran et al.

(10) Patent No.: US 6,792,756 B2
(45) Date of Patent: Sep. 21, 2004

(54) GAS SUPPLY CONTROL DEVICE FOR A GAS STORAGE POWER PLANT

(75) Inventors: Velimir Bakran, Rimbach (DE); Ralf Gerdes, Untersiggenthal (CH); Peter Keller-Sornig, Baden (CH); Bozidar Seketa, Neuenhof (CH)

(73) Assignee: Alstom Technology LTD, Baden (CH)

( * ) Notice: Subject to any disclaimer, the term of this patent is extended or adjusted under 35 U.S.C. 154(b) by 0 days.

(21) Appl. No.: 10/218,565

(22) Filed: Aug. 15, 2002

(65) Prior Publication Data
US 2003/0037547 A1 Feb. 27, 2003

Related U.S. Application Data
(60) Provisional application No. 60/312,786, filed on Aug. 17, 2001.

(30) Foreign Application Priority Data
May 7, 2002 (CH) .............................................. 0782/02

(51) Int. Cl.[7] ......................... F01D 19/00; F01D 21/00; F01K 3/02; F01K 7/22; F01K 13/02
(52) U.S. Cl. ............................ 60/657; 60/646; 60/652; 60/659; 60/39.091; 60/39.1
(58) Field of Search ........................ 60/646, 657, 659, 60/39.6, 39.091, 652, 650, 682, 398, 39.1

(56) References Cited

U.S. PATENT DOCUMENTS

| | | | | |
|---|---|---|---|---|
| 3,448,581 A | * | 6/1969 | Nettel ........................... | 60/652 |
| 4,003,200 A | * | 1/1977 | Zerlauth ................... | 60/39.091 |
| 4,058,973 A | * | 11/1977 | Ferm et al. .............. | 60/39.091 |
| 6,276,123 B1 | | 8/2001 | Chen et al. | |

FOREIGN PATENT DOCUMENTS

| | | | |
|---|---|---|---|
| DE | 2263102 | 6/1974 | |
| DE | 2263051 | 7/1974 | |
| DE | 2444909 | 4/1976 | |
| EP | 0563553 | 10/1993 | |
| GB | 772287 | 4/1957 | |
| JP | 58023204 A | * 2/1983 | ............. F01K/3/02 |
| JP | 58107804 A | * 6/1983 | ............. F01K/3/02 |
| WO | WO96/01942 | 1/1996 | |

OTHER PUBLICATIONS

John Daly, et al., "CAES—Reduced to Practice", ASME Turbo Expo 2001, Jun. 4–7, 2001, New Orleans, Louisiana, p. 1–14.

* cited by examiner

Primary Examiner—Sheldon J. Richter
(74) Attorney, Agent, or Firm—Burns, Doane, Swecker & Mathis, L.L.P.

(57) ABSTRACT

The present invention relates to a gas storage power plant (1) with a gas store (8), a turbogroup (2) and a gas supply line (9) which leads from the gas store (8) to the turbogroup (2). A gas supply control device (12) is arranged in the gas supply line (9).

So that a gas flow cam be provided, even in an emergency, the gas supply control device (12) has a main line (14) and a bypass line (19). The main line (14) forms a section of the gas supply line (9). In the main line (14) is arranged a main valve arrangement (15) which shuts off the main line (14) in an emergency. The bypass line (19) bypasses the main valve arrangement (15). In the bypass line (19) is arranged a bypass valve arrangement (20) which opens the bypass line (19) in an emergency.

11 Claims, 1 Drawing Sheet

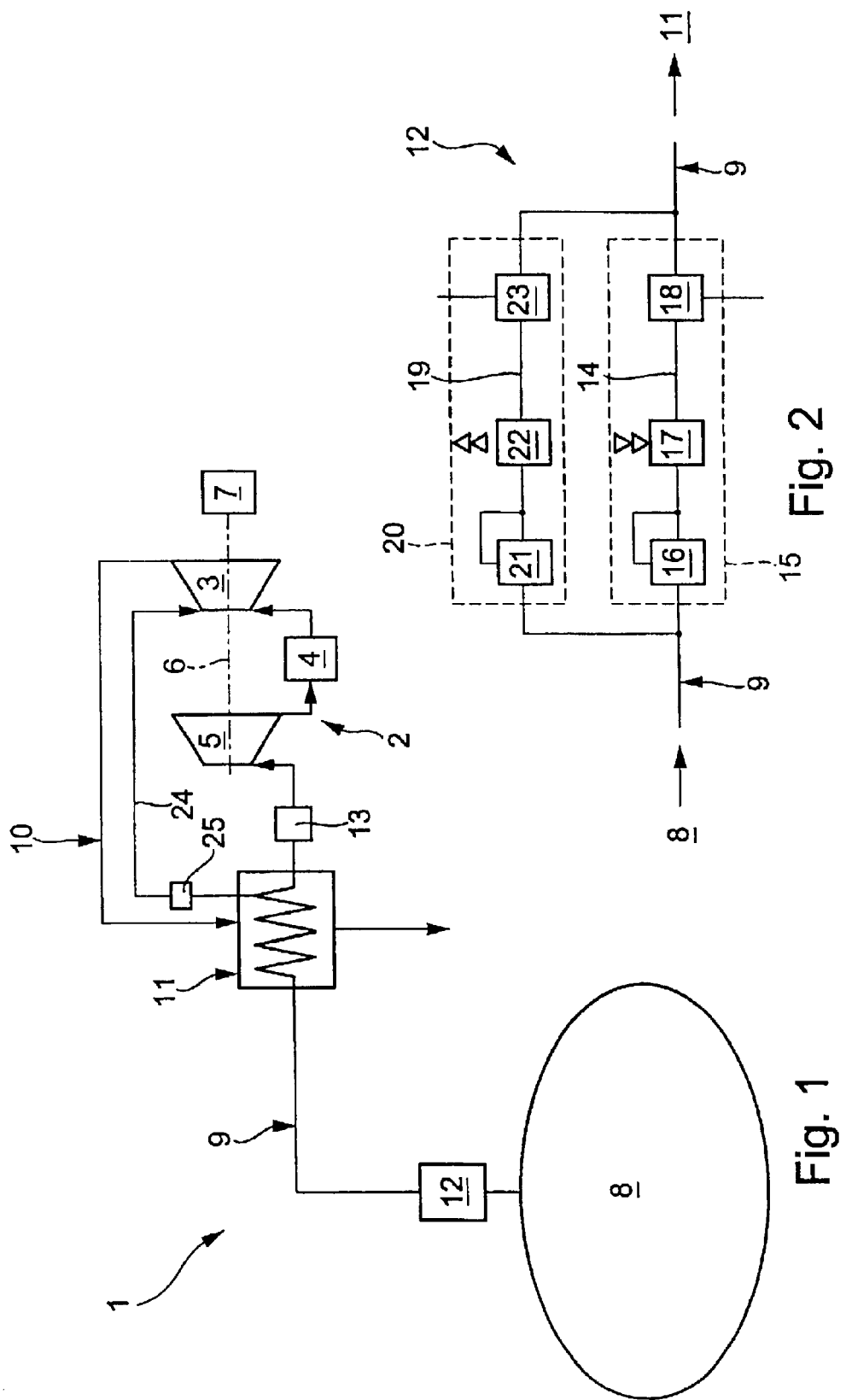

GAS SUPPLY CONTROL DEVICE FOR A GAS STORAGE POWER PLANT

This application claims the benefit of Provisional Application No. 60/312,786, filed Aug. 17, 2001.

FIELD OF THE INVENTION

The invention relates to a gas supply control device for a gas storage power plant, having the features of the preamble of claim 1. The invention relates, moreover, to a gas storage power plant having the features of the preamble of claim 11.

BACKGROUND OF THE INVENTION

Gas storage power plants of the type specified here are usually referred to as "COMPRESSED AIR ENERGY STORAGE SYSTEM", in short CAES system. The basic idea of a CAES system is to store excess energy which is generated by permanently operated conventional power stations during the light-load times with a low current price. This is achieved in that air or another gas is pumped under relatively high pressure into a store with the aid of the cost-effective excess energy. The air or gas is extracted from this store, as required, in order to generate peak load at a high current price. This means that the energy is kept in stock retrievably in the form of potential energy. Exhausted coal or salt mines, for example, serve as stores. Since the gas kept in stock in the gas store is usually air, a gas storage power plant of this type is generally also designated as an air storage power plant.

Gas storage power plants of this type are known, for example, from the report "CAES-REDUCED TO PRACTICE" by John Daly, R. M. Loughlin of Dresser-Rand, Mario DeCorso, David Moen of Power Tech Associates, Inc., and Lee Davis of Alabama Electric Cooperative, Inc., which was presented at the "ASME Turbo Expo 2001". According to this, a gas storage power plant comprises a gas store, in which a gas can be stored under pressure, and a turbogroup which has at least one turbine. A gas supply line connects the gas store to the turbogroup, so that the turbine of the turbogroup can be driven by the gas from the gas store. In a section of the gas supply line which is located near the gas store, a gas supply control device is arranged in the latter and, in the known gas storage power plant, is formed by a valve.

In specific emergencies, it may be necessary to terminate the operation of the turbogroup quickly, this being achieved with the aid of an emergency cut-off of the turbogroup, during which, for example, the fuel supply to the combustion chamber of the turbogroup and the gas supply to the turbogroup are shut off. In an emergency of this kind, the gas supply line can be shut off in the vicinity of the gas store with the aid of the valve of the gas supply control device. For specific applications, however, even in emergencies of this kind, it may be necessary to provide a gas flow, for example in order to cool the turbine or the combustion chamber. The outlay for providing an alternative gas flow is relatively high when the gas store is shut off.

SUMMARY OF THE INVENTION

The invention is intended to remedy this. The present invention is concerned with the problem of specifying for a gas supply control device of the type initially mentioned an improved embodiment which, particularly in an emergency, makes it possible to provide a desired gas flow.

This problem is solved, according to the invention, by means of the subjects of the independent claims. Advantageous embodiments are the subject matter of the dependent claims.

The invention is based on the general idea of equipping the gas supply control device with two lines which run parallel and through which a flow is capable of passing, to be precise with a main line and with a bypass line, in an emergency the main line being closed, while the bypass line is opened. This means that the main line is operated on what is known as the "Fail-Safe-Closed Principle", while the bypass line operates on what is known as the "Fail-Safe-Open Principle". Then, in an emergency, assuming an appropriate dimensioning of the bypass line, a sufficient gas flow can be ensured, even when the main line is shut off. So that these emergency functions can be implemented in the lines of the gas supply control device, the main line contains a main valve arrangement with at least one valve, while the bypass line comprises a bypass valve arrangement with at least one valve. When the main valve arrangement is in an emergency operating state, which may be triggered, for example, by an emergency shutdown of the turbogroup, the main valve arrangement causes the main line to be shut off, while the bypass valve arrangement ensures a flow through the bypass line.

In a particularly advantageous embodiment, the bypass valve arrangement may have a pressure regulating valve which is designed in such a way that, in the emergency operating state of the main valve arrangement, it opens the bypass line and makes it possible to regulate the pressure in the bypass line downstream of the pressure regulating valve. By virtue of this form of construction, the bypass flow can be regulated, even during emergency operation. This is advantageous, in particular, when, according to a development, the gas flow capable of being extracted from the gas store by means of the bypass line is used for cooling the turbogroup or the components of the latter. The pressure regulating valve of the bypass valve arrangement then allows a specific setting of the cooling-gas flow as a function of the current cooling requirement.

Further important features and advantages of the invention may be gathered from the subclaims, from the drawings and from the accompanying figure description with reference to the drawings.

BRIEF DESCRIPTION OF THE DRAWINGS

A preferred exemplary embodiment of the invention is illustrated in the drawings and is explained in more detail in the following description. In the drawings, in each case diagrammatically, FIG. 1 shows a basic illustration, resembling a circuit diagram, of a gas storage power plant according to the invention, and FIG. 2 shows a basic illustration, resembling a circuit diagram, of a gas supply control device according to the invention.

DETAILED DESCRIPTION OF THE INVENTION

According to FIG. 1, a gas storage power plant 1 according to the invention, illustrated only partially, comprises at least one turbogroup 2 which, here, has a turbine 3, a combustion chamber 4 assigned to this turbine 3 and a preceding additional turbine 5. The turbines 3 and 5 are drive-connected via a common shaft 6 to one another and to a generator 7 which serves for current generation. The gas storage power plant 1 has, moreover, a gas store 8, in which a working gas of the gas storage power plant 1 can be stored under pressure. The working gas used is preferably air; it is clear, however, that, in principle any other gas may serve as a working gas. It is assumed below that the gas storage power plant 1 is operated with air as a working gas. Correspondingly, the additional turbine 5 supplied with the gas or with the air via a gas supply line 9 is designated below as an air turbine 5, while the turbine 3 supplied with the hot combustion exhaust gases of the combustion chamber 4 is designated below as a gas turbine 3.

Downstream of the gas turbine 3, the expanded exhaust gases are led via an exhaust-gas line 10, through a recuperator 11, to an exhaust-gas system, not shown here, which may comprise, in particular, a muffler and/or an exhaust-gas emission control device. In the recuperator 11, the exhaust-gas line 10 and the gas supply line 9 are coupled to one another in a heat-transmitting manner, with the result that the heat energy contained in the exhaust gas can be utilized for preheating the fresh gas supplied to the air turbine 5.

It is clear that a gas storage power plant 1 of this type has, moreover, at least one compressor group, not illustrated here, with the aid of which the gas store 8 can be refilled/filled up or recharged/charged up with working gas, that is to say, preferably with air.

A gas supply control device 12, symbolized merely by a rectangle in FIG. 1, is arranged, upstream of the recuperator 11, in the gas supply line 9. Furthermore, the gas supply line 9 has arranged in it, downstream of the recuperator 11 and upstream of the turbogroup 2, a valve arrangement 13, by means of which the air supply to the turbogroup 2 can be regulated. For safety reasons, this valve arrangement 13 is usually designed on what is known as the "Fail-Safe-Closed Principle", that is to say, in an emergency, the valve arrangement 13 shuts off the gas supply line 9 between the recuperator 11 and the turbogroup 2.

According to FIG. 2. the gas supply control device 12 has a main line 14 which forms a section of the gas supply line 9. The main line 14 contains a main valve arrangement 15. symbolized by a frame depicted by broken lines, which, in the preferred embodiment shown here, comprises a pressure regulating valve 16, downstream of this a quick-acting stop valve 17 and, downstream of the latter, a pressure limiting valve 18. The main valve arrangement 15 is designed in such a way that, in an emergency operating state, it shuts off the main line 14. For this purpose, at least the quick-acting stop valve 17 is designed in such a way that it opens the main line 14 when the main valve arrangement 15 is operating normally and shuts off said main line in the emergency operating state. During normal operation, relatively high storage pressure in the store 8 is reduced with the aid of the pressure regulating valve 16 to a lower working pressure at which the recuperator 11 and the following components through which the flow passes can be acted upon. The pressure regulating valve 16 may be designed in such a way that, in an emergency, it shuts off the main line 14 in addition to the quick-acting stop valve 17. The pressure limiting valve 18 is designed in such a way that the recuperator 11 and the following components, through which the flow passes, of the power plant 1 are protected against inadmissibly high pressures.

Moreover, according to the invention, the gas supply control device 12 has a bypass line 19 which bypasses the main valve arrangement 15. For this purpose, the bypass line 19 branches off from the main line 14 or from the gas supply line 9 upstream of the main valve arrangement 15, then runs parallel to the main line 14 and is connected again to the main line 14 or to the gas supply line 9 downstream of the main valve arrangement 15. Arranged in the bypass line 19 is a bypass valve arrangement 20 which is likewise symbolized here by a frame represented by broken lines. In the embodiment shown here, the bypass valve arrangement 20 comprises a pressure regulating valve 21, downstream of this a quick-acting stop valve 22 and, downstream of the latter, a pressure limiting valve 23. The bypass valve arrangement 20 is designed in such a way that it opens the bypass line 19 in an emergency which causes the main line 14 to be shut off in the main valve arrangement 15. That is to say, the bypass valve arrangement 20 operates on what is known as the "Fail-Safe-Open Principle". For this purpose, the quick-acting stop valve 22 is constructed in such a way that it opens the bypass line 19 in the emergency referred to, that is to say in the emergency operating state of the main valve arrangement 15.

The pressure regulating valve 21 serves for regulating the pressure of the bypass flow in an emergency operating state of the main valve arrangement 15. In the event that an emergency occurs at the pressure regulating valve 21 itself, the latter is expediently designed in such a way that it opens the bypass line 19. The pressure limiting valve 23 is set in such a way that it limits the bypass flow to a preset pressure value.

In order to simplify pressure regulation in the normal operating state, in normal operation the bypass valve arrangement 20 is switched in such a way that the bypass line 19 is shut off. The quick-acting stop valve 22 and/or the pressure regulating valve 21 are then expediently in their shut-off position. This means that the bypass line 19 is activated only in an emergency which is relevant to the main valve arrangement 15.

The bypass line 19 is expediently dimensioned such that the gas volume stream of the bypass flow when the main line 14 is closed is considerably smaller than the gas volume stream of the main flow when the bypass line 19 is closed. This ensures, simply by virtue of structural preconditions, that the bypass volume stream cannot result in damage to the following components of the plant 1 through which the flow passes.

A preferred use for the bypass flow or emergency flow capable of being generated with the aid of the gas supply control device 12 according to the invention may be explained with reference to FIG. 1. When the main line 14 is shut off and the bypass line 19 is opened, a cooling-gas line 24 is simultaneously activated, in that a corresponding valve 25 is actuated to open it. This cooling-line valve 25 is likewise designed on the Fail-Safe-Open Principle and produced, for example, as a quick-acting stop valve. The cooling-gas line 24 expediently branches off from the gas supply line 9 within the recuperator 11 and leads, for example, to the inlet of the gas turbine 3. By the cooling flow being branched off within the recuperator 11, a predetermined temperature for the cooling flow can be achieved, which, on the one hand, ensures sufficient cooling of the hot turbine parts, in particular of the turbine blades, and, on the other hand, avoids excessive thermal stresses within the components to be cooled.

The gas storage power plant 1 according to the invention operates as follows:

During normal operation, the bypass line 19 is shut off and the main line 14 is opened, the control valve arrangement 13 is opened and the cooling-line valve 25 is shut off. The turbogroup 2 can be operated properly. In an emergency requiring an emergency shutdown of the turbogroup 2, the valves or valve arrangements designed on the Fail-Safe-Closed Principle are immediately shut off: the main valve arrangement 15 or its quick-acting stop valve 17 and, if appropriate, its pressure regulating valve 16, and also the valve arrangement 13. In contrast to this, the valves or valve arrangements designed on the Fail-Safe-Open Principle are opened: the bypass valve arrangement 20 or its quick-acting stop valve 22 and, if appropriate, its pressure regulating valve 21, and also the cooling-line valve 25. In an emergency operation, therefore, a bypass flow can be formed, which passes from the gas store 8 via the bypass line 19 into the recuperator 11 and is then led via the cooling line 24 to the inlet of a gas turbine 3. A sufficiently large cooling-gas flow is thereby ensured for cooling the hot components of the gas turbine 3, even when, in an emergency, the Fail-Safe-Closed components for the main gas supply of the turbogroup 2 are shut off. Additionally or alternatively to the generation of a cooling-gas flow, in an emergency the bypass flow may also be used for the safe operation of other components or flow processes.

Although the gas supply control device 12 shown here is particularly suitable for installation in a gas supply line 9 of a gas storage power plant 1, other areas of use are also possible.

List of Reference Symbols

Gas storage power plant
2 Turbogroup
3 Turbine/gas turbine
4 Combustion chamber
5 Additional turbine/air turbine
6 Shaft
7 Generator
8 Gas store
9 Gas supply line
Exhaust-gas line
11 Recuperator
12 Gas supply control device
13 Valve arrangement
14 Main line of 12
15 Main valve arrangement of 14
16 Pressure regulating valve of 15
17 Quick-acting stop valve of 15
18 Pressure limiting valve of 15
19 Bypass line of 12
20 Bypass valve arrangement of 19
21 Pressure regulating valve of 20
22 Quick-acting stop valve of 20
23 Pressure limiting valve of 20
24 Cooling-gas line
25 Cooling-line valve

What is claimed is:

1. A gas supply control device for a gas storage power plant with at least one gas store, at least one turbogroup and at least one gas supply line which leads from the gas store to the turbogroup, the gas supply control device being provided for arrangement in the gas supply line, wherein the gas supply control device has a main line through which a flow is capable of passing and a bypass line through which a flow is capable of passing, the main line forming a section of the gas supply line in the gas supply control device arranged in the gas supply line, a main valve arrangement with at least one valve being arranged in the main line, including means for shutting off the main line in an emergency operating state of the main valve arrangement, the bypass line bypassing the main valve arrangement, and a bypass valve arrangement having at least one valve being arranged in the bypass line and including means for opening the bypass line in the emergency operating state of the main valve arrangement, the bypass valve arrangement having a quick-acting stop valve and including means for opening the bypass line in the emergency operating state of the main valve arrangement.

2. The gas supply control device as claimed in claim 1, wherein the pressure regulating valve is arranged upstream of the quick-acting stop valve in the bypass line.

3. The gas supply control device as claimed in claim 1, wherein the bypass valve arrangement includes means for shutting off the bypass line in a normal operating state of the main valve arrangement.

4. The gas supply control device as claimed in claim 1, wherein the bypass line includes a gas volume stream which flows through the bypass line in the emergency operating state of the main valve arrangement is smaller than a gas volume stream which flows through the main line in the normal operating state of the main valve arrangement.

5. The gas supply control device as claimed in claim 1, wherein the emergency operating state of the main valve arrangement arises when an emergency shutdown is carried out for the turbogroup.

6. The gas supply control device as claimed in claim 1, wherein the bypass valve arrangement has a pressure regulating valve said pressure regulating valve opens the bypass line and including means for regulating pressure in the bypass line downstream of the pressure regulating valve.

7. The gas supply control device as claimed in claim 6, wherein the pressure regulating valve is designed in such a way that it opens the bypass line in an emergency operating state of the pressure regulating valve.

8. The gas supply control device as claimed in claim 1, wherein the bypass valve arrangement has a pressure limiting valve which is designed in such a way that, at least in the emergency operating state of the main valve arrangement, said pressure limiting valve limits the pressure in the bypass line downstream of the pressure limiting valve to a predetermined value.

9. The gas supply control device as claimed in claim 8, wherein the pressure limiting valve is arranged downstream of the quick-acting stop valve in the bypass line.

10. A gas storage power plant comprising at least one gas store, at least one turbogroup and at least one gas supply line which leads from the gas store to the turbogroup, a recuperator in the gas supply line, a gas supply control device being arranged in the gas supply line, wherein the gas supply control device has a main line through which a flow is capable of passing and a bypass line through which a flow is capable of passing, the main line forming a section of the gas supply line, a main valve arrangement with at least one valve being arranged in the main line and being designed in such a way that it shuts off the main line in an emergency operating state of the main valve arrangement, the bypass line bypassing the main valve arrangement, and a bypass valve arrangement having at least one valve arranged in the bypass line and being designed in such a way that it opens the bypass line in the emergency operating state of the main valve arrangement, the gas supply control device being arranged upstream of the recuperator in the gas supply line, the gas supply line being coupled, in the recuperator, in a heat-transmitting manner to an exhaust-gas line which discharges the exhaust gases of the turbogroup from the latter.

11. The gas storage power plant as claimed in claim 10, wherein, in the emergency operating state of the main valve arrangement, the open bypass line provides a gas volume stream for generating a cooling-gas flow for cooling the turbogroup and/or for cooling at least one component of a turbogroup, through which a flow is capable of passing.

* * * * *